J. W. ANDERSON.
WAGON-BRAKE LEVER.
No. 187,579. Patented Feb. 20, 1877.
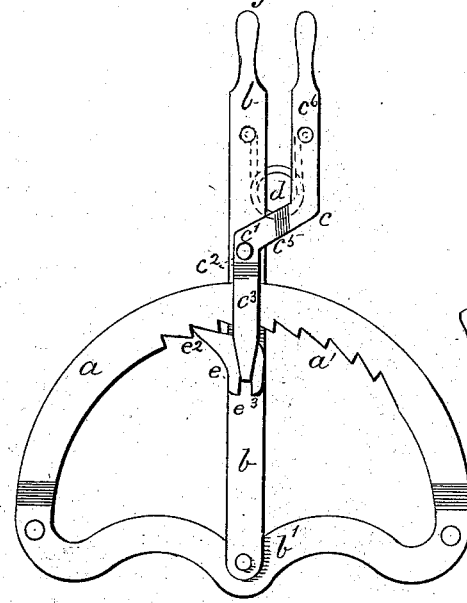
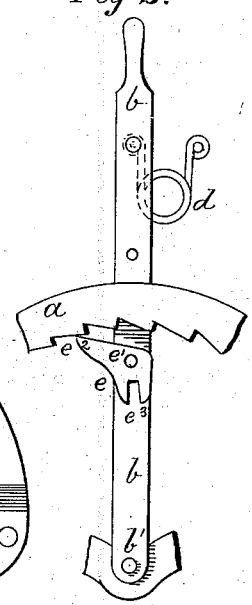
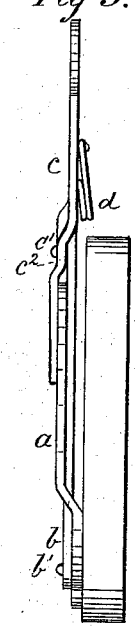
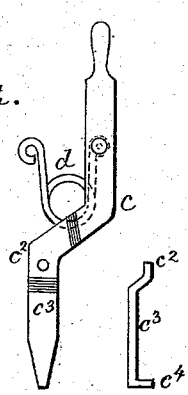
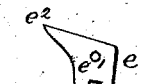
Witnesses.
B. C. Pole
R. H. Lacey.
Inventor.
John W. Anderson.
By R. S. & A. P. Lacey
his attorney

UNITED STATES PATENT OFFICE.

JOHN W. ANDERSON, OF SOUTH BEND, INDIANA.

IMPROVEMENT IN WAGON-BRAKE LEVERS.

Specification forming part of Letters Patent No. 187,579, dated February 20, 1877; application filed July 14, 1876.

*To all whom it may concern:*

Be it known that I, JOHN W. ANDERSON, of South Bend, in the county of St. Joseph and State of Indiana, have invented certain new and useful Improvements in Wagon-Brakes; and I do hereby declare that the following is a full, clear, and exact description thereof, which will enable others skilled in the art to which it pertains to make and use the same, reference being had to the accompanying drawing, and to the letters of reference marked thereon, which form a part of this specification.

My invention relates to improvements in devices for operating wagon-brakes; and it consists in the construction, combination, and arrangement of the operating-levers, dog or pawl, and segmental rack, as hereinafter fully described, and set forth in the claims.

In the drawing, Figure 1 is a front elevation. Fig. 2 is the main operating-lever, with dog or pawl attached, and the segmental rack. Fig. 3 is a side or edge view, and Figs. 4 and 5 are detail views.

$a$ is the segment-rack, having the ratchet-teeth $a'$ on its lower edge. The rack $a$ is secured rigidly and substantially to the sideboard of the wagon-box, and is slightly set off therefrom, to make room for the actuating-lever $b$.

The lever $b$ has its fulcrum on the pin $b'$, the axis of which is concentric with the segment-rack $a$. The lever $b$ is made straight, and is provided with necessary holes for making connection with the brakes. $c$ is the lever for operating the dog or pawl, which engages with the teeth $a'$. It has its fulcrum on the pin $c^1$ on the lever $b$, above the segment-rack $a$. For several inches above and below its fulcrum it lies against the lever $b$, thus providing a parallel bearing-surface, $c^2$, which gives greater strength and steadiness to its movements. Just above the segment $a$ it curves outward and downward, so that the lower portion $c^3$ is on the outer side of, and near to, the outer face of the segment-rack, thus providing the necessary means whereby the levers are held to, and guided in their movements on, the rack when operating the brakes.

On the lower end of the portion $c^3$ is the inwardly-projecting pin $c^4$, which engages in the slot in the dog or pawl, hereinafter described. Its upper end, above the parallel bearing $c^2$, is bent forward and inward at $c^5$, and upward, so as to bring the upper portion $c^6$ parallel with, and in the same plane with, the upper end of the lever $b$.

The handles of the levers $b$ and $c$ are made and arranged so that they can be conveniently grasped by the hand and brought close together.

It will be seen that when the lever $c$ is pivoted to the lever $b$, as described, the segment $a$ will be embraced between the levers, the latter being held firmly in place, and all variations or wabblings effectually prevented.

$d$ is a spring, attached to the upper ends and on the inner sides of the levers $b$ and $c$. It acts on the lever $c$, which connects with the pawl, and causes the latter to engage in the teeth $a'$ on the under edge of the segment $a$.

$e$ is the dog or pawl, secured by the pin $e^1$, on which it turns, to the lower end of lever $b$, immediately below the segment $a$, and so that the point $e^2$ will engage the teeth $a'$. Its lower end is provided with the slot $e^3$, into which the pin $c^4$ projects. This slot permits the free operation of the lever $c$ in turning the pawl out of the teeth $a'$.

The simplicity of the construction of my brake-lever will be readily seen. I dispense with all guide-frames and complicated machinery for giving steadiness or effectiveness to the operation of the device. The levers themselves make the necessary guide slots or frame, while the handles are arranged so that they may readily be grasped and operated by one hand, and any of the parts may be made or repaired by ordinary mechanics.

Having described my invention, what I claim, and desire to secure by Letters Patent, is—

1. The combination, with the lever $b$ and segment $a$, of the lever $c$, bent in the form described, and provided with the pin $c^4$, substantially as and for the purpose described.

2. The combination, with the lever $b$ and lever $c$, having the pin $c^4$ and segment-rack $a$, of the dog or pawl $e$, having the slot $e^3$, arranged and operating substantially as and for the purpose set forth.

In testimony that I claim the foregoing as my own I affix my signature in presence of two witnesses.

JOHN W. ANDERSON.

Witnesses:
H. C. CRAWFORD,
S. M. VAN LOON.